United States Patent
Hewitt (10) Patent No.: US 12,260,768 B2
(45) Date of Patent: Mar. 25, 2025

(54) SIGNAL TRANSMITTING DEVICE

(71) Applicant: BAE SYSTEMS plc, London (GB)

(72) Inventor: Charles Hewitt, Rochester (GB)

(73) Assignee: BAE SYSTEMS PLC, London (GB)

( * ) Notice: Subject to any disclaimer, the term of this patent is extended or adjusted under 35 U.S.C. 154(b) by 378 days.

(21) Appl. No.: 17/289,438

(22) PCT Filed: Oct. 31, 2019

(86) PCT No.: PCT/GB2019/053082
§ 371 (c)(1),
(2) Date: Apr. 28, 2021

(87) PCT Pub. No.: WO2020/089629
PCT Pub. Date: May 7, 2020

(65) Prior Publication Data
US 2021/0390865 A1    Dec. 16, 2021

(30) Foreign Application Priority Data

Nov. 1, 2018   (EP) ..................................... 18275167
Nov. 1, 2018   (GB) ..................................... 1817872

(51) Int. Cl.
*G08G 5/00*    (2025.01)
*G01S 13/74*   (2006.01)
*G01S 13/91*   (2006.01)
*G01S 13/95*   (2006.01)
*G08G 5/02*    (2006.01)
(Continued)

(52) U.S. Cl.
CPC ............... *G08G 5/22* (2025.01); *G01S 13/74* (2013.01); *G01S 13/913* (2013.01); *G01S 13/95* (2013.01); *G08G 5/54* (2025.01)

(58) Field of Classification Search
None
See application file for complete search history.

(56) References Cited

U.S. PATENT DOCUMENTS 3,729,737 A  *  4/1973  Asam ...................... G01S 13/70
                                                      342/33
4,418,349 A     11/1983  Hofgen et al.
(Continued)

FOREIGN PATENT DOCUMENTS

EP    2685442 A2    1/2014
EP    3199980 A1    8/2017
(Continued)

OTHER PUBLICATIONS

International Search Report and Written Opinion received for PCT Application No. PCT/GB2019/053082. Mail date: Jan. 31, 2020. 15 pages.
(Continued)

*Primary Examiner* — Aniss Chad
*Assistant Examiner* — Madison R. Inserra
(74) *Attorney, Agent, or Firm* — Finch & Maloney PLLC (57) ABSTRACT

A signal transmitting device is provided for communicating with an aircraft in the vicinity of a landing area. The signal transmitting device is configured to receive a signal from the aircraft and further configured to transmit a return signal to the aircraft automatically upon receipt of the signal. The return signal comprises information regarding the landing area.

17 Claims, 6 Drawing Sheets

(51) Int. Cl.
*G08G 5/22* (2025.01)
*G08G 5/54* (2025.01)
*G01S 13/76* (2006.01)

(56) References Cited

U.S. PATENT DOCUMENTS

| | | | |
|---|---|---|---|
| 5,208,601 A | 5/1993 | Hart | |
| 5,736,955 A | 4/1998 | Roif | |
| 5,748,136 A | 5/1998 | Fischer | |
| 6,185,486 B1 | 2/2001 | Labounsky et al. | |
| 7,898,463 B1 | 3/2011 | Mueller et al. | |
| 8,175,799 B1* | 5/2012 | Woehler | G01C 21/20 340/901 |
| 8,576,113 B1 | 11/2013 | Seah et al. | |
| 2018/0281988 A1* | 10/2018 | Tellechea | G08G 5/0047 |
| 2019/0064341 A1* | 2/2019 | Bunch | G01S 13/86 |
| 2020/0292735 A1* | 9/2020 | Hadi | G08G 1/09 |

FOREIGN PATENT DOCUMENTS

| | | |
|---|---|---|
| WO | 9004795 A1 | 5/1990 |
| WO | 2020089629 A1 | 5/2020 |

OTHER PUBLICATIONS

GB Combined Search and Examination Report under Sections 17 and 18(3) received for GB Application No. 1915804.7, dated Apr. 20, 2020. 7 pages.

GB Search Report under Section 17(5) received for GB Application No. 1817872.3, dated May 1, 2019. 4 pages.

Extended European Search Report received for EP Application No. 18275167.7, dated May 15, 2019. 8 pages.

International Preliminary Report on Patentability received for PCT Application No. PCT/GB2019/053082. Mail date: May 14, 2021. 9 pages.

\* cited by examiner

SIGNAL TRANSMITTING DEVICE

BACKGROUND

Landing areas for aircraft typically comprise markings that are used by a pilot of the aircraft to determine information regarding the landing area, for example a landing area may be marked with a number relating to the heading of the landing area, and other markings relating to other physical parameters of the landing area or guidance about how to land at the landing area.

DETAILED DESCRIPTION

Landing areas are typically marked with various marks such that a pilot upon approach to the landing area may observe the marks and gain information regarding the landing area. Observing the marks on the landing area may allow the pilot to obtain positive verification of the landing area during approach. However, in situations where the landing area is obscured, for example due to low cloud cover, fog or other meteorological conditions the pilot may not be able to view the marks on the landing area, and therefore may not be able to verify information regarding the landing area.

Figure 1:
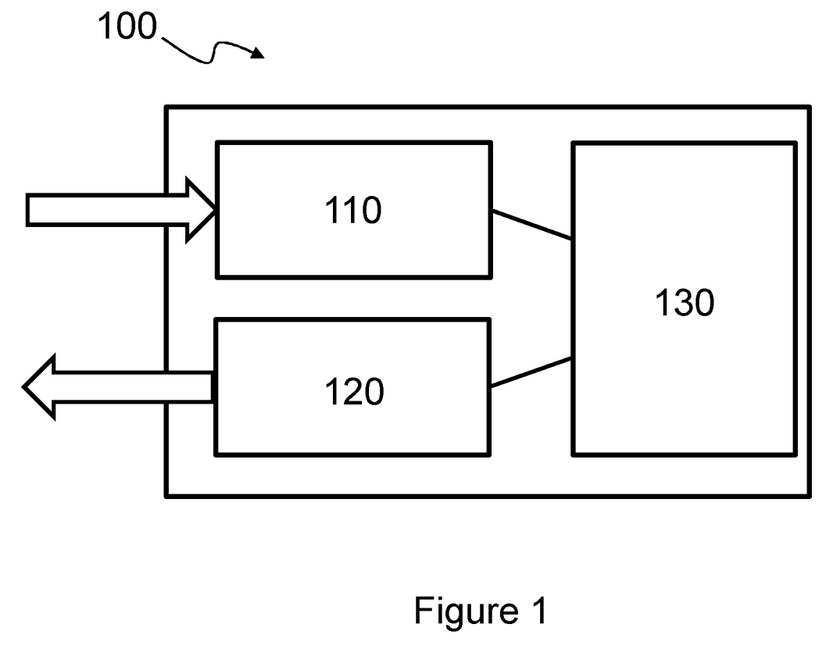
FIG. 1 illustrates a schematic of a signal transmitting device according to some examples.

FIG. 1 illustrates a landing area signal transmitting device 100 according to some examples. Landing area signal transmitting device 100 comprises a signal receiving module 110, a signal transmitting module 120, and information storage module 130. The landing area signal transmitting device 100 is configurable to receive a signal from an aircraft in the vicinity of the landing area, using the signal receiving module 110. The landing area signal transmitting device 100 may transmit a return signal to the aircraft automatically upon receipt of the signal from the aircraft. The return signal comprises information regarding the landing area, such that that the pilot of the aircraft may be informed of the information transmitted by the landing area signal transmitting device 100.

The landing area signal transmitting device 100 allows for information regarding the landing area to be obtained even in scenarios where the runway is not visible to the user of the aircraft, and provides confirmation to the user of the aircraft that they are approaching the correct landing area.

In use, an aircraft may approach a landing area. The aircraft may comprise an aircraft mounted signal transmitting device, such as a radar transmitter or any other type of suitable signal transmitting device. The aircraft mounted signal transmitting device may transmit a signal to the landing area signal transmitting device 100. The signal may be received at the landing area signal transmitting device 100 and automatically retransmitted as a return signal to the aircraft. The signal is automatically retransmitted as it does not require any human interaction or input to transmit the signal to the aircraft. The return signal contains information regarding the landing area associated with the landing area signal transmitting device 100.

The aircraft may be configured to receive the return signal, and decode the return signal to obtain the information regarding the landing area. Once the information regarding the landing area is obtained, the aircraft may provide the information regarding the landing area to a user of the aircraft, such as a pilot or other flight crew. In this manner, the user of the aircraft would be either provided with a positive confirmation that they are approaching the correct landing area, or would be provided with information informing them they are not approaching the correct landing area and would be able to take the appropriate action.

In some examples the landing area signal transmitting device 100 may be a passive device. For example, the landing area signal transmitting device 100 may comprise a symbol painted with a material configured to reflect the signal. Here it would be understood that the signal receiving module 110, the signal transmitting module 120 and the information storage module 130 are all part of the painted symbol. The reflected signal may be received by the aircraft and decoded to provide the information regarding the landing area. In some examples decoding the information may comprise receiving the signal to form a received image, and optically identifying the symbol from the image using an optical character recognition technique. The information regarding the landing area may then be determined based on the identified symbol.

In some examples the symbol may comprise a machine-readable optical representation of data, such as a barcode, a two-dimensional matrix code, or a similar style of code.

In some examples the symbol may comprise a human-readable symbol, such as an alphanumeric symbol or a pictorial symbol.

This technique may allow existing markings on landing areas, such as runway identification numbers (e.g. 27L) to be overpainted with a paint to reflect the signal, and the symbol may be decoded in the aircraft to notify the user of the aircraft whether they are approaching the landing area in the correct manner.

In some examples, the signal receiving module 110 and the signal transmitting module 120 may comprise signal receiving circuitry and signal transmitting circuitry respectively. The signal receiving circuitry may receive the signal, and the information storage module 130 may modify the received signal to encode the information regarding to the return signal. The return signal may then be transmitted by the signal transmitting circuitry.

In some examples the power to transmit the return signal may be provided by the received signal, such that no internal power source is required. In some examples the signal transmitting device 100 may comprise a power source.

In some examples the signal transmitting device 100 may be a transponder.

In some examples the signal transmitting device 100 may comprise a location device. The location device may comprise information regarding the location of the signal transmitting device 100.

The location device may be configurable to determine a location of the signal transmitting device 100. In some examples the location device may comprise a Global Navigation Satellite Systems (GNSS) receiver configured to receive signals from at least two satellites to determine the location of the signal transmitting device 100. By using such a location device it is possible to ensure that the signal transmitting device 100 continually comprises up to date information regarding its location. This may allow the signal transmitting device 100 to be portable, such that it may be used at temporary landing areas.

GNSS receiver systems may comprise at least one of a Global Positioning System (GPS) receiver, Global Navigation Satellite System (GLONASS) receiver, BeiDou Navigation Satellite System receiver, a Galileo positioning system receiver, Indian Regional Navigation Satellite System receiver, or Quasi-Zenith Satellite System (QZSS) receiver.

In some examples the signal transmitting device 100 may be directional such that it may receive and/or transmit signals in a restricted range of directions. This may allow aircraft that are approaching from a particular direction to interact with the signal transmitting device 100, and prevent aircraft which are not approaching from a particular specified direction to interact with the signal transmitting device 100.

Figure 2:
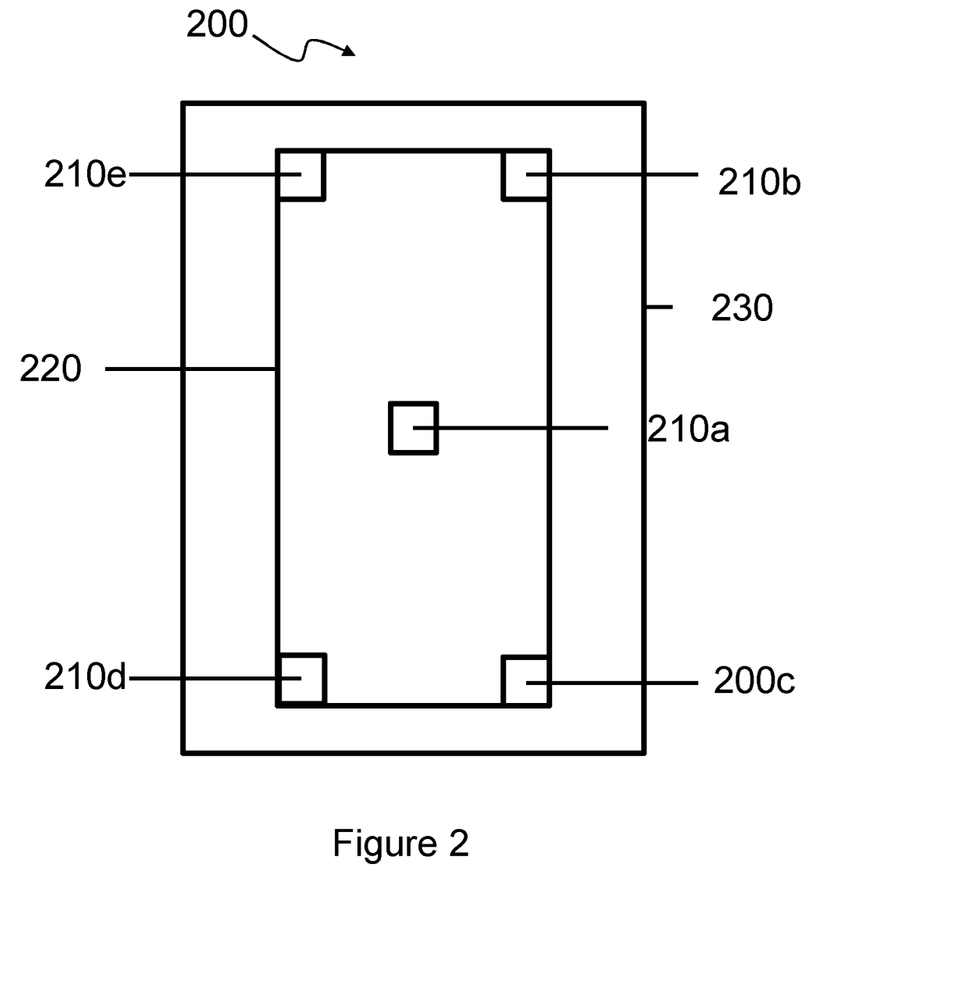
FIG. 2 illustrates a landing area comprising a plurality of signal transmitting devices.

FIG. 2 illustrates a landing area 200 according to some examples. The landing area 200 may comprise a plurality of signal transmitting devices 210a-210e. The signal transmitting devices 210a-210e may be similar to that described in relation to the signal location device 100. Landing area may comprise an outer boundary 230 and an inner boundary 220. The outer boundary may define the physical limit of the landing area 200, such as the extent of concrete on the landing area. The inner boundary 220 may define the area of the landing area 200 which is suitable for aircraft to land on. However, in some examples the outer boundary 230 and the inner boundary 220 may substantially occupy the same area.

Each of the plurality of signal transmitting devices 210a-e may be located at predetermined locations on the landing area 200. For example, FIG. 2 illustrates that signal transmitting devices 210b-e are each located at a corner of the inner boundary 220 such that they assist to define the boundary 220. Signal transmitting device 210a is located substantially at the centre of the landing area 200. The placement and number of the signal transmitting devices 210a-e may vary, such that there may be any number of signal transmitting devices 210a-e located on the landing area 200, and the signal transmitting devices 210a-e may be located at any suitable positions on the landing area.

Each of the plurality of signal transmitting devices may comprise different information regarding the landing area and have different permitted ranges and angles of communications. For example, the centre signal transmitting device 210a may transmit signals in a relatively wide spatial range and contain information regarding the identity of the landing area. The outer signal transmitting devices 210b-e may transmit in a relatively narrow spatial range and contain information regarding the boundary of the landing area 200, such that the aircraft would be given information that would enable the user of the aircraft to be aware of whether they were, for example, on a heading that was heading inside or outside of the landing area 200 boundary 220.

Each of the signal transmitting devices may be portable, such that a temporary landing area may be set up conveniently and quickly, and that a user of an aircraft approaching the temporary landing area may be aware of information regarding the temporary landing area, such as an identity of the temporary landing area, or the location of the centre of the runway, or a location of the perimeter of the landing area. The signal transmitting devices for use with the temporary landing area may further comprise location means, such as a GNSS receiver, such that they are able to independently determine their location.

Figure 3:
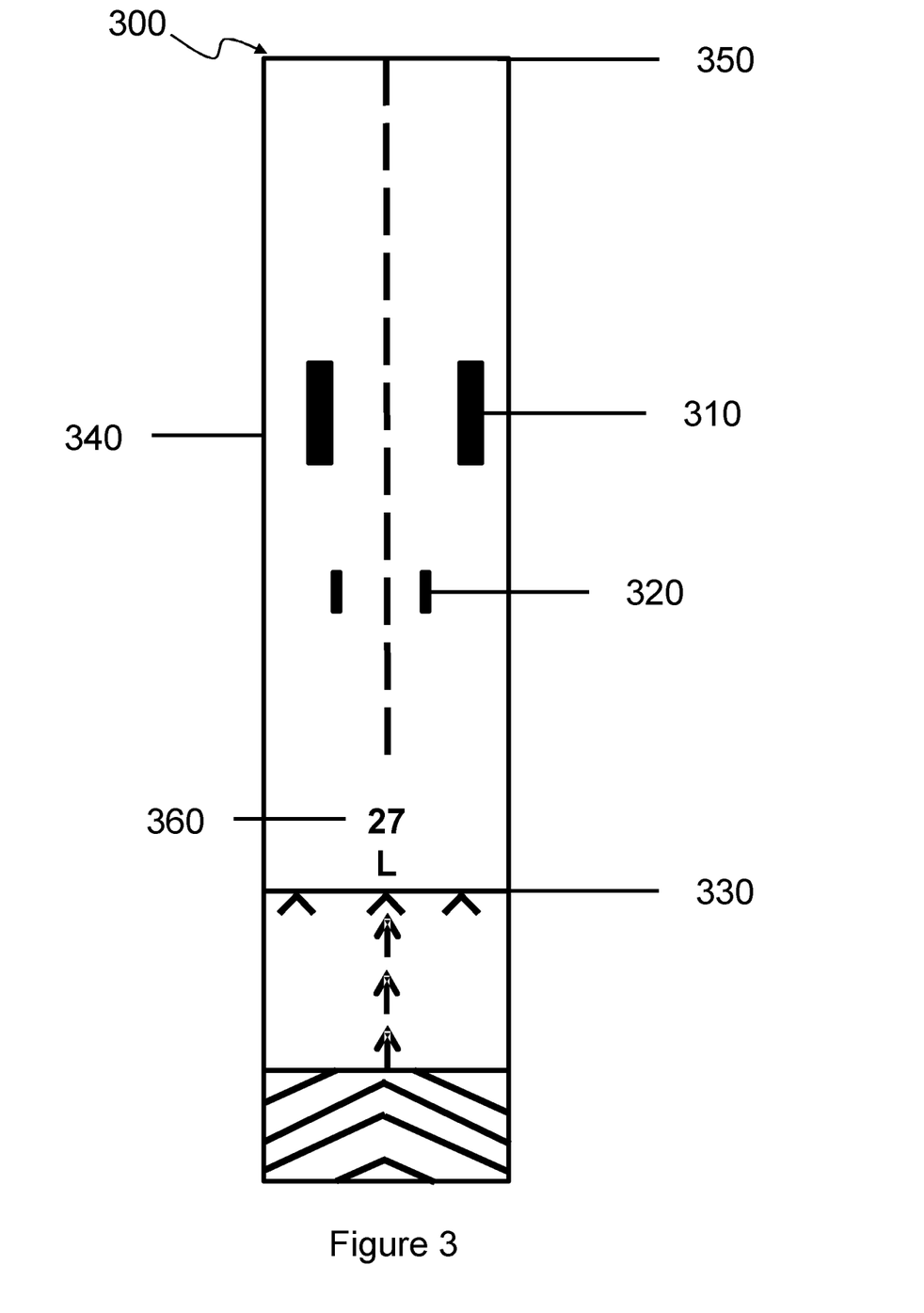
FIG. 3 illustrates a runway comprising a plurality of signal transmitting devices.

In some examples the landing area may be a runway. FIG. 3 illustrates a runway 300 in accordance with some examples. The runway 300 may comprise landing markings 310, which an aircraft may aim for when landing on runway 300. The runway 300 may also comprise a plurality of markings, such as setdown markings 320, threshold markings 330, runway boundary markings 340, runway end markings 350, and runway identification markings 360. Each of the markings may have associated with it a signal transmitting device 100 as described above. Runway identification markings 360 may have associated with it a signal transmitting device configured to provide to an approaching aircraft the identity of the runway upon receipt of a signal from the approaching aircraft. Each of setdown markings 320, threshold markings 330, runway boundary markings 340 and runway end markings 350 may comprise a signal transmitting device that is configured to transmit on receipt of the signal from an aircraft a return signal to the approaching aircraft identifying the location of the respective marking. The aircraft may be configured to use the information received from any of the signal transmitting devices to inform the user of the aircraft the suitability of their approach, or any other relevant information.

Figure 4:
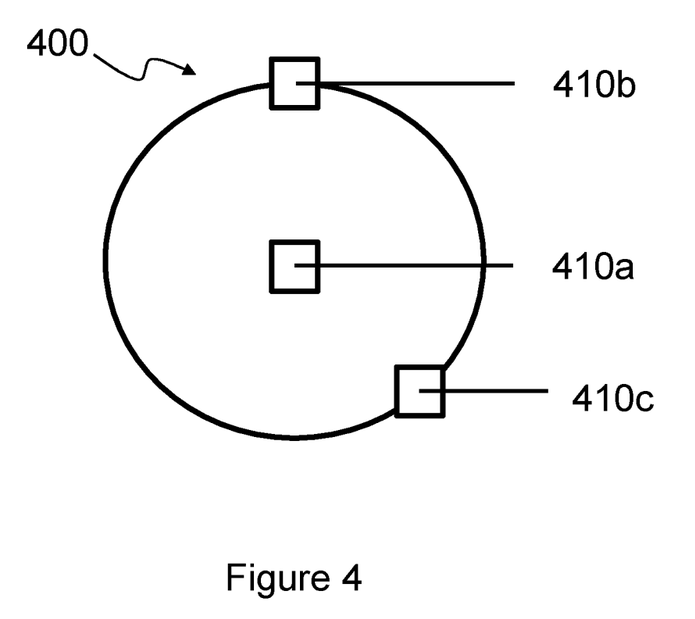
FIG. 4 illustrates a vertical landing area comprising a plurality of signal transmitting devices.

FIG. 4 illustrates a vertical landing area 400 in accordance with some examples. The vertical landing area 400 may be suitable for aircraft with a vertical landing capability, such as a helicopter. The vertical landing area may be provided with at least one portable signal transmitting device 410a-c. Each signal transmitting device may be similar to that discussed in relation to FIG. 1, however the portable signal transmitting devices 410a-c may each comprise a location device, such as a GNSS receiver, such that the portable signal transmitting devices are capable of determining their own locations. In this way, a temporary landing area may be laid out quickly simply by placing the portable signal transmitting devices 410a-c at appropriate locations on the vertical landing area 400. This may allow a user landing an aircraft at the vertical landing area 400 to be aware of the perimeter and location of the vertical landing area 400 even in situations where the vertical landing area 400 markings are not visible for some reason, such as in a brownout caused by downwash, weather conditions, or a choice not to use visible markings.

Vertical landing area 400 is illustrated as being circular, but vertical landing area 400 may be any shape. The vertical landing area 400 may also be used for aircraft without a vertical landing capability.

Figure 5:
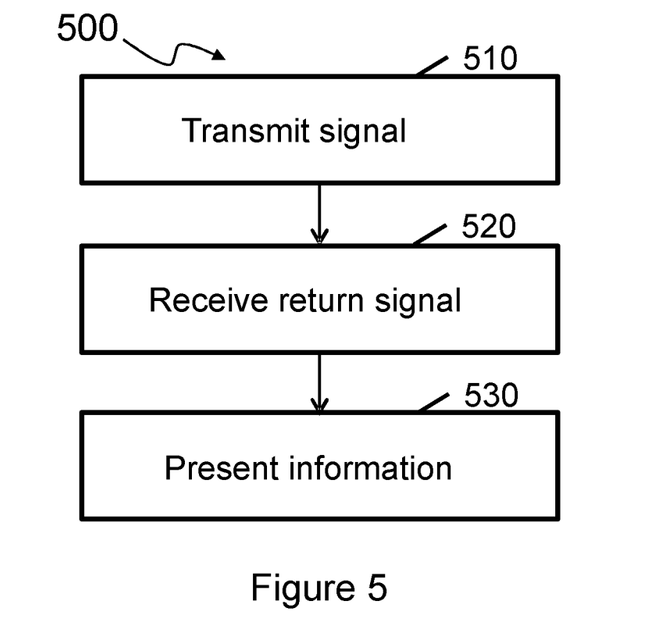
FIG. 5 illustrates a method according to some examples.

FIG. 5 illustrates a transmitting method 500 of communicating with a signal transmitting device. The method comprises transmitting a signal to a signal transmitting device 510 associated with a landing area, receiving a return signal from the signal transmitting device 520 the return signal comprising information regarding the landing area, and presenting the information to a user of the aircraft. The transmitting method 500 may be operated by processing means on an aircraft.

Transmitting the signal to the transmitting device 510 may comprise transmitting the signal using any suitable transmitting device, such as a radar transmitter, or a laser. In some examples transmitting the signal to the signal transmitting device may comprise transmitting the signal using a weather radar. This may allow the method to be performed on existing aircraft without substantial modification.

The signal transmitting device may automatically retransmit the signal to the aircraft in the form of a return signal. The return signal may comprise information regarding the landing area. In some examples the information regarding the landing area may comprise an identity of the landing area, a heading of the landing area, or a relative location of the landing area (such as whether it is a left or a right landing area). The information regarding the landing area may also comprise a location of the landing area, a location of a particular feature of the landing area, such as a perimeter, or guide marks. The information regarding the landing area may comprise any combination of the aforementioned features, and also may comprise and other useful information for the user of the aircraft.

The method 500 comprises receiving the return signal from the signal transmitting device. As stated above, the return signal may comprise information regarding the landing area. The aircraft may receive the signal at receiving circuitry, such as an antenna or detector. The aircraft may be configured to process the received signal to decode the information regarding the aircraft.

In some examples decoding the information may comprise converting the received signal into an image, the image comprising human-readable and/or machine-readable symbols. In some examples decoding the image may comprise converting the received signal into an image and performing character recognition on the converted image. The character recognition may be an optical character recognition process, or any other suitable process.

The method 500 comprises presenting the information to the user of the aircraft 530. In some examples presenting the information may comprise presenting the information visually using a display. In some examples presenting the information may comprise presenting the information in an audible format. In this way the user is given positive verification that they are approaching the landing area that they believe they are approaching even when they are not able to see the landing area or any of the associated markings. If the user of the aircraft is mistaken then they will receive information that demonstrates that they are mistaken and allow them to take any appropriate action.

In some examples the incoming and return signal may be transmitted in the same format and with substantially same frequency and wavelength. In some examples the incoming and return signal may be transmitted in the same format and with a different frequency and/or wavelength. In some examples the incoming and return signal may be transmitted in different formats. Format in this context refers to the type of signal that is transmitted, i.e. the format may be radar transmission, a laser signal, or any other suitable signal.

Figure 6:
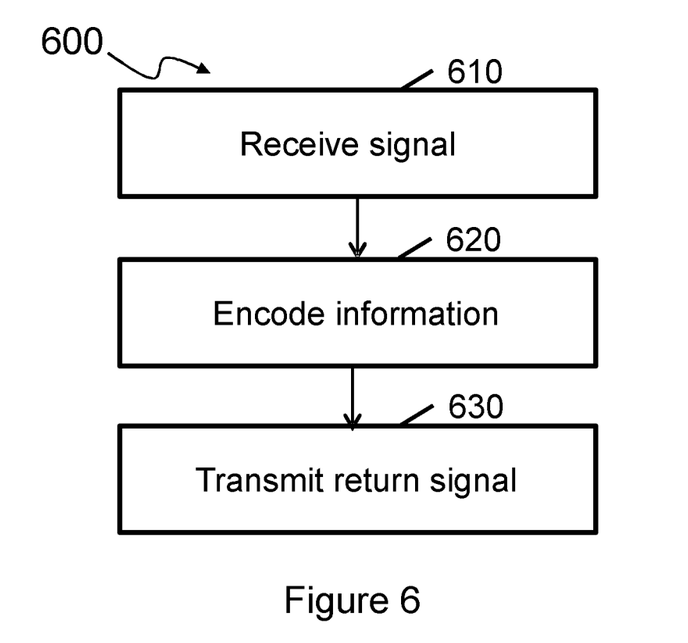
FIG. 6 illustrates a method according to some examples.

FIG. 6 illustrates a method for providing landing area information to an aircraft using a signal transmitting device 600. The method comprises receiving a signal from an aircraft 610, encoding information onto a return signal 620, and transmitting the return signal to the aircraft 630.

The signal may be received by a signal transmitting device as described above in relation to FIGS. 1 and 2. In some examples the signal may be received by a transceiver or a transponder. In some examples the signal may be received from a restricted range of directions. This may allow only aircraft approaching from a particular direction to communicate with the signal transmitting device and reduce the likelihood of aircraft that are not intending to land at the landing area from receiving unwanted communications.

A return signal may be encoded with information regarding the landing area 620. The information may be encoded by reflecting a symbol such that an image received by the aircraft comprises an image of the symbol. Alternatively, the information may be encoded to the return signal by modulating the signal or any other suitable technique.

A return signal may be transmitted to the aircraft 630.

Figure 7:
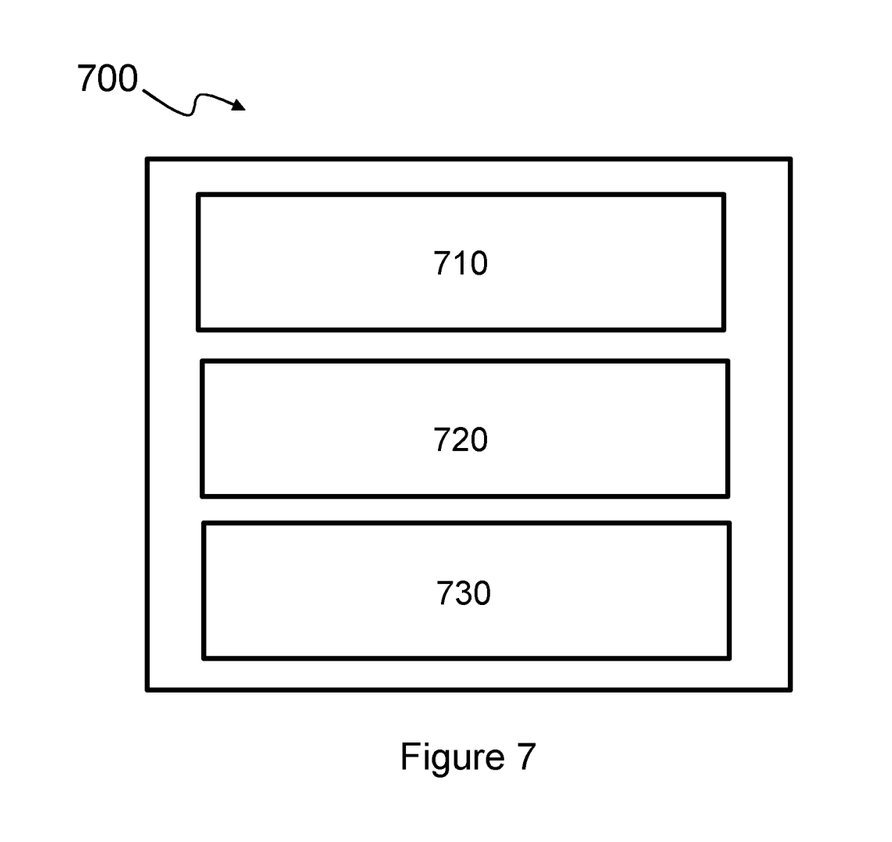
FIG. 7 illustrates a computer-readable storage medium according to some examples.

FIG. 7 illustrates a machine readable medium 700 according to some examples. Machine readable medium comprises signal transmitting module 710, signal receiving module 720 and signal decoding module 730. Each module comprises instructions, that when executed cause a processing means to perform a method as described in relation to FIGS. 5 and 6.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A signal transmitting device for communicating with an aircraft in the vicinity of a temporary landing area, the signal transmitting device configured to receive, at the temporary landing area, a signal from the aircraft, to encode and transmit a return signal from the temporary landing area to the aircraft automatically in response to receiving the signal from the aircraft,
   wherein the return signal comprises the signal from the aircraft modified by the signal transmitting device to include a location of a center of a runway of the temporary landing area and/or a location of a boundary of the temporary landing area,
   wherein the signal transmitting device is a portable device, and
   wherein the signal transmitting device is configured to transmit the return signal over a restricted range of directions.

2. The signal transmitting device according to claim 1, wherein the signal from the aircraft is a radar signal.

3. The signal transmitting device according to claim 1, wherein the return signal comprises information regarding the temporary landing area, wherein the information regarding the temporary landing area comprises landing area identification and/or landing area boundary information optically encoded as the at least one character, and wherein the return signal is configured to be converted into an image of the at least one character for subsequent processing using an optical character recognition technique.

4. A system comprising a plurality of signal transmitting devices according to claim 1, each signal transmitting device locatable at various locations on the temporary landing area.

5. The system according to claim 4, wherein at least one of the signal transmitting devices is located on a boundary of the temporary landing area, and/or at least one of the signal transmitting devices is located on a central area of the temporary landing area.

6. A method for use on an aircraft, wherein the method comprises:

transmitting a signal to the signal transmitting device according to claim 1;

receiving the return signal from the signal transmitting device, wherein the return signal comprises information regarding the temporary landing area; and causing presentation of the information regarding the landing area to a user of the aircraft.

7. The signal transmitting device according to claim 1, further comprising a location device to determine the location of the center of a runway of the temporary landing area and/or the location of the boundary of the temporary landing area, wherein the location device comprises a global navigation satellite system receiver.

8. The signal transmitting device according to claim 1, wherein the signal transmitting device is a passive device.

9. A signal transmitting device for communicating with an aircraft in the vicinity of a temporary landing area, the signal transmitting device configured to receive, at the temporary landing area, a signal from the aircraft, to encode and transmit a return signal from the temporary landing area to the aircraft automatically in response to receiving the signal from the aircraft, wherein the signal transmitting device comprises a symbol painted with a paint, the paint configured to reflect the signal from the aircraft encoded with the return signal, wherein the return signal comprises the signal from the aircraft modified by the signal transmitting device to include a location of a center of a runway of the temporary landing area and/or a location of a boundary of the temporary landing area is optically encoded as at least one character in the symbol, wherein the signal transmitting device is a portable device, and wherein the signal transmitting device is configured to transmit the return signal over a restricted range of directions.

10. The signal transmitting device according to claim 9, wherein the symbol comprises an alphanumeric symbol.

11. The signal transmitting device according to claim 9, wherein the symbol comprises a human-readable symbol.

12. A system comprising a plurality of signal transmitting devices according to claim 9, each signal transmitting device locatable at various locations on the temporary landing area.

13. The system according to claim 12, wherein at least one of the signal transmitting devices is located on a boundary of the temporary landing area, and/or at least one of the signal transmitting devices is located on a central area of the temporary landing area.

14. A method for use on an aircraft, wherein the return signal comprises information regarding the landing area, and wherein the method comprises:

transmitting a signal to the signal transmitting device according to claim 9;

receiving the return signal from the signal transmitting device; and causing presentation of the information regarding the landing area to a user of the aircraft.

15. A computer program product including one or more non-transitory machine-readable mediums encoded with instructions that when executed by one or more processors cause a process to be carried out on an aircraft, the process comprising:

cause transmission of a signal from the aircraft to a signal transmitting device of a temporary landing area;

receive data representative of a return signal received from the signal transmitting device, the return signal responsive to the signal from the aircraft and comprising a location of the signal transmitting device encoded therein by the signal transmitting device; and cause presentation of the location of the signal transmitting device;

wherein the signal transmitting device comprises a symbol painted with a paint, the paint configured to reflect the signal from the aircraft encoded with the location of the signal transmitting device, wherein the return signal comprises the signal from the aircraft modified by the signal transmitting device to include a location of a center of a runway of the temporary landing area and/or a location of a boundary of the temporary landing area optically encoded as at least one character in the symbol by the signal transmitting device, wherein the signal transmitting device is a portable device, and wherein the signal transmitting device is configured to transmit the return signal over a restricted range of directions.

16. The computer program product according to claim 15, wherein the location of the signal transmitting device further comprises landing area identification and/or landing area boundary information.

17. The computer program product according to claim 15, wherein the process includes decoding the return signal to obtain the location of the signal transmitting device by converting the return signal into an image of the at least one character for subsequent processing using an optical character recognition technique.

\* \* \* \* \*